United States Patent
Mizuno et al.

(10) Patent No.: US 8,950,560 B2
(45) Date of Patent: Feb. 10, 2015

(54) VEHICULAR POWER UNIT

(75) Inventors: Kinya Mizuno, Wako (JP); Yasushi Fujimoto, Wako (JP); Masaya Murao, Wako (JP); Kazuhiko Nakamura, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 179 days.

(21) Appl. No.: 13/540,980

(22) Filed: Jul. 3, 2012

(65) Prior Publication Data

US 2013/0008760 A1    Jan. 10, 2013

(30) Foreign Application Priority Data

Jul. 5, 2011    (JP) .................. 2011-149089

(51) Int. Cl.
| | | |
|---|---|---|
| F16D 23/12 | (2006.01) | |
| F16D 28/00 | (2006.01) | |
| B60W 30/19 | (2012.01) | |

(52) U.S. Cl.
CPC ............... F16D 23/12 (2013.01); *B60W 30/19* (2013.01); *B60W 2300/36* (2013.01)
USPC .......................... 192/20; 192/70.23; 192/84.6

(58) Field of Classification Search
CPC .................. F16D 2500/1117; F16D 2500/112
USPC ..................... 192/3.56, 48.2, 70.23
See application file for complete search history.

(56) References Cited

U.S. PATENT DOCUMENTS

| | | | | |
|---|---|---|---|---|
| 4,592,458 | A * | 6/1986 | Matsuki et al. | 192/83 |
| 4,828,069 | A * | 5/1989 | Hatsuyama | 180/219 |
| 7,673,729 | B2 * | 3/2010 | Fujimoto et al. | 192/48.3 |
| 8,607,954 | B2 * | 12/2013 | Nedachi | 192/84.6 |
| 2010/0122884 | A1 * | 5/2010 | Mizon et al. | 192/48.2 |
| 2012/0242330 | A1 * | 9/2012 | Uchisasai et al. | 324/207.25 |

FOREIGN PATENT DOCUMENTS

| | | |
|---|---|---|
| JP | 04-266619 A | 9/1992 |
| JP | 2008-110665 A | 5/2008 |
| JP | 2009-137560 A | 6/2009 |
| JP | 2011-073479 A | 4/2011 |
| JP | 2011-074763 A | 4/2011 |

* cited by examiner

*Primary Examiner* — Rodney H Bonck
(74) *Attorney, Agent, or Firm* — Westerman, Hattori, Daniels & Adrian, LLP

(57) ABSTRACT

A power unit includes, electric motors for generating driving forces for respectively engaging clutches, and a clutch cover covering outer sides of the clutches in a direction along a power shaft. The electric motors are disposed in such a manner that drive axes arranged in a longitudinal direction thereof are perpendicular to the direction along the power shaft; further, the electric motors are disposed on the periphery of the clutch cover within a width W in the direction along the power shaft.

7 Claims, 7 Drawing Sheets

VEHICULAR POWER UNIT

CROSS-REFERENCE TO RELATED APPLICATION

This application claims priority of Japanese Application No. 2011-149089, filed Jul. 5, 2011, the entire contents of which are herein incorporated by reference.

The present disclosure relates to a vehicular power unit for engaging and disengaging a clutch device by utilizing a driving force of a clutch actuator.

BACKGROUND OF THE INVENTION

Conventionally, there are known vehicles, such as motorcycles and ATVs (All Terrain Vehicles), of the type including a so-called AMT (Automatic Manual Transmission). The AMT is one type of clutch driving device for engaging and disengaging a clutch device by utilizing a driving force of a clutch actuator such as an electric motor.

For example, an AMT described Japanese Patent Application Publication No. 2009-137560 includes an electric motor (clutch actuator) disposed in a clutch cover covering one side of a unit case in a direction along a power shaft of a power unit.

SUMMARY OF THE INVENTION

However, the above conventional configuration has the following problem. Specifically, since the clutch actuator is disposed at the side of the clutch device, the clutch actuator bulges outward in the direction along the power shaft of the power unit, increasing the size of the power unit case in the direction along the power shaft.

In accordance with the disclosure, it is beneficial to downsize a power unit case of a vehicular power unit for engaging and disengaging a clutch device by utilizing a driving force of a clutch actuator, the benefit being achieved by suppressing a bulge of the clutch actuator in a direction along a power shaft of the power unit.

As means for solving the above-mentioned problem, an aspect of the disclosure provides a vehicular power unit including:

a power unit case for housing a power shaft;

a clutch device disposed on one side of the power unit case in a direction along the power shaft;

a clutch actuator for generating a driving force for engaging and disengaging the clutch device; and a clutch cover attached to the power unit case in such a manner as to cover an outer side of the clutch device in the direction along the power shaft, wherein the clutch actuator is disposed in such a manner that a drive axis arranged in a longitudinal direction thereof is perpendicular to the direction along the power shaft, and further the clutch actuator is disposed on a periphery of the clutch cover within a width of the clutch cover in the direction along the power shaft.

Another aspect of the disclosure is that the clutch actuator is disposed above the clutch cover.

Moreover, another aspect of the disclosure is that the vehicular power unit includes, a power transmission mechanism for transmitting the driving force of the clutch actuator to the clutch device, wherein the power transmission mechanism has an engagement shaft, which is disposed in parallel to a drive shaft of the clutch actuator, and which is engaged with an input part of the clutch device, and the drive shaft of the clutch actuator, a reduction gear shaft, and the engagement shaft are arranged to form a U shape when seen in the direction along the drive shaft.

Another aspect of the disclosure is that the power transmission mechanism has a plurality of the reduction gear shafts.

Furthermore, another aspect of the present invention is that the vehicular power unit includes, a cylinder standing upright above the power unit case, wherein the drive axis of the clutch actuator is arranged in parallel to a cylinder axis along a direction in which the cylinder stands upright.

Still further, another aspect of the present invention is that at least a portion of the clutch actuator laps on the cylinder when seen in the direction along the power shaft.

According to the disclosure, the longitudinal direction of the clutch actuator is arranged in a direction perpendicular to the power shaft of the power unit. This makes it possible to suppress a bulge of the clutch actuator in the direction along the power shaft. Moreover, since the clutch actuator is disposed on the periphery of the clutch cover within the width in the direction along the power shaft, the power unit can be made compact. Furthermore, since the clutch actuator is disposed outside the clutch cover, the maintainability of the clutch actuator can be improved.

According to another aspect of the disclosure, by effectively utilizing a space above the clutch cover, the clutch actuator can be disposed without increasing the size of the power unit.

According to still another aspect of the disclosure, a power transmission pathway from the clutch actuator to the clutch device is formed of the multiple parallel shafts, and thus can be simplified. In addition, the clutch actuator, the reduction gear shaft, and the engagement shaft are arranged compactly, and downsizing of the power transmission mechanism can be achieved.

Still further, a compact arrangement of the multiple reduction gear shafts is made possible, and downsizing of the power transmission mechanism can be achieved.

Also, since the clutch actuator is disposed along the cylinder, the mass of the power unit can be concentrated.

Further, since the clutch actuator is disposed closely to the cylinder, the mass of the power unit can be further concentrated.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, an embodiment of the present invention will be described with reference to the drawings. Note that, in the following description, unless specifically stated otherwise, directions such as front, rear, left, and right coincide with those of a vehicle described below. Moreover, the arrow FR indicating the front side of the vehicle, the arrow LH indicating the left side of the vehicle, and the arrow UP indicating the upper side of the vehicle are drawn at appropriate positions of the drawings used for the following description.

Figure 1:
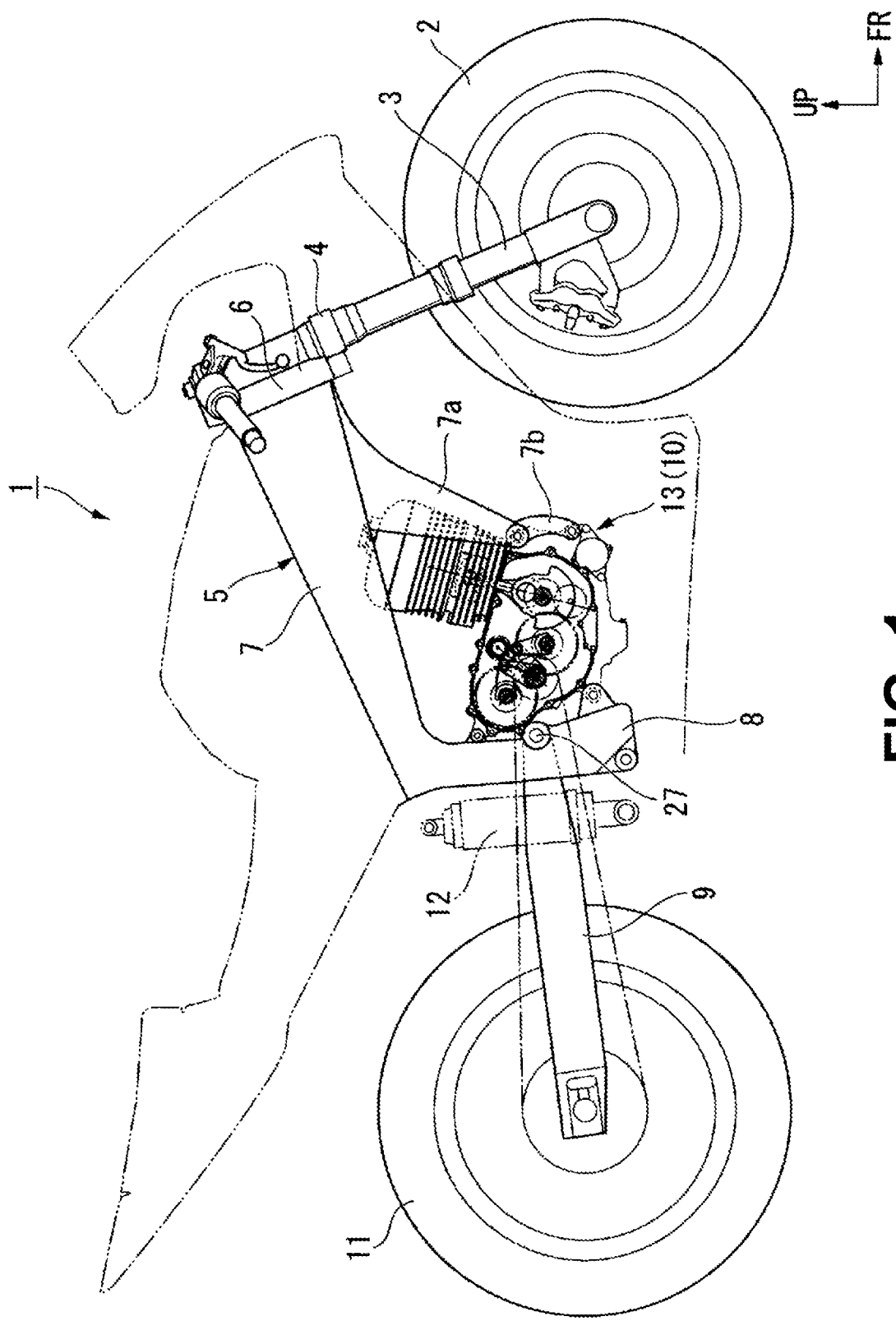
FIG. 1 is a right-side view of a motorcycle according to an embodiment of the present invention.

In a motorcycle (saddle ride-type vehicle) 1 shown in FIG. 1, an upper portion of a front fork 3 pivotally supporting a front wheel 2 of the motorcycle 1 is steerably and pivotally supported by a head pipe 6 through a steering stem 4, the head pipe 6 located at a front end portion of a vehicle-body frame 5. A main frame 7 extends from the head pipe 6 obliquely downward to the rear. An upper end portion of a pivot frame 8 is connected to a rear end portion of the main frame 7. A front end portion of a swingarm 9 is pivotally supported in a vertically swingable manner on a middle portion, in a vertical direction, of the pivot frame 8. A rear wheel 11 is pivotally supported by a rear end portion of the swingarm 9. A cushion unit 12 is interposed between a front portion of the swingarm 9 and a rear portion of the vehicle-body frame 5. Note that, in the drawing, reference numeral 27 denotes a pivot shaft that is a swing shaft of the swingarm 9; reference numeral 7a denotes a down frame extending obliquely downward to the rear from a front lower portion of the main frame 7; reference numeral 7b denotes a hanger bracket attached to a tip end portion of the down frame 7a.

A power unit 10 that is a power engine of the motorcycle 1 is mounted on the vehicle-body frame 5.

Figure 2:
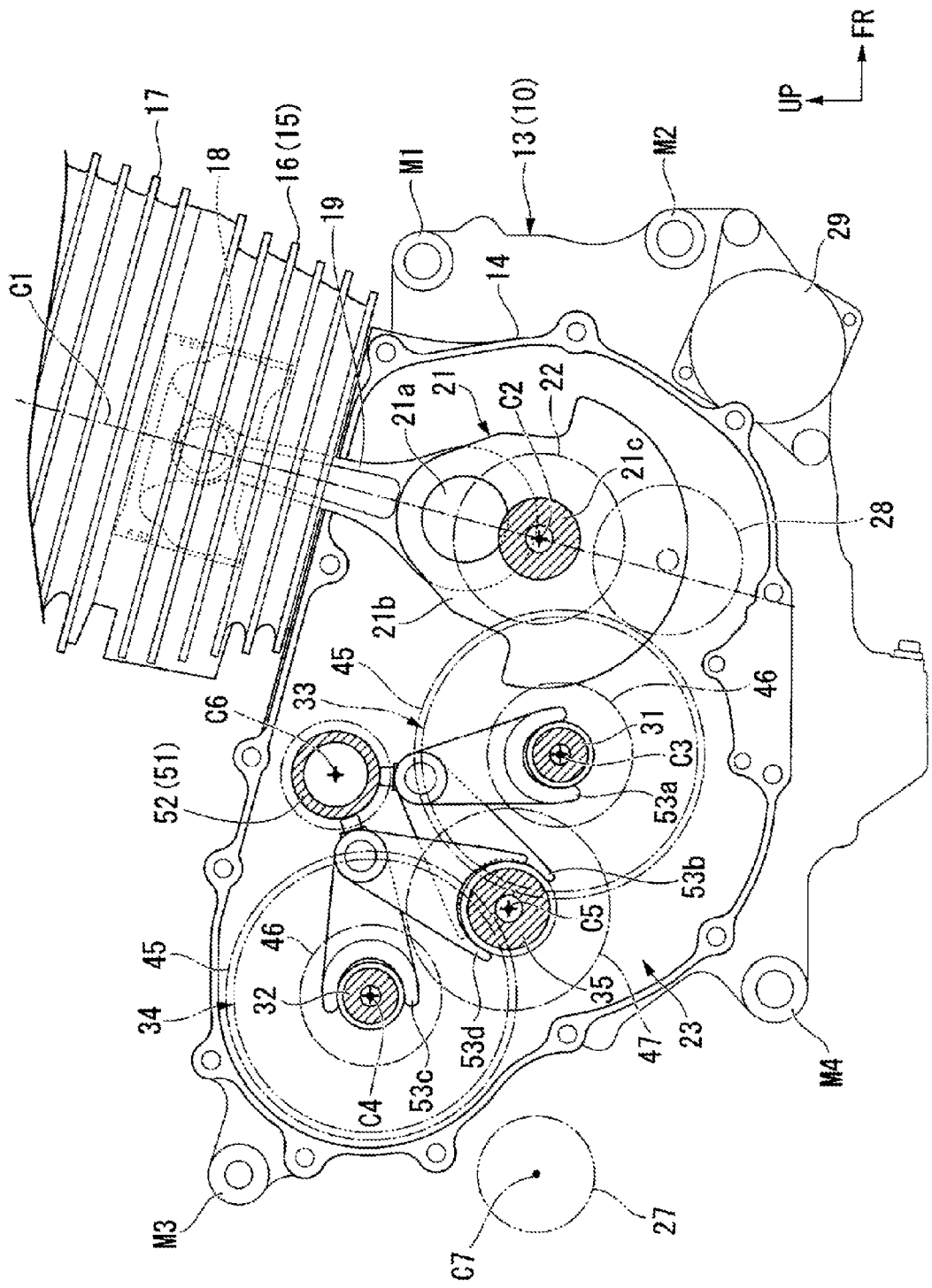
FIG. 2 is a right-side view of a power unit of the motorcycle.

Referring to FIG. 2 together, the power unit 10 integrally has: an air-cooled single-cylinder engine (hereinafter simply referred to as engine) 13 constituting a front part of the power unit 10; and a twin-clutch transmission (hereinafter simply referred to as transmission) 23 continuous with a rear portion of the engine 13.

The engine 13 has a basic configuration that a cylinder 15 is provided on a crankcase (power unit case) 14. The cylinder 15 has an upright posture inclining frontward with respect to a vertical direction. Note that, in the drawing, reference numeral C1 denotes a cylinder axis along a direction in which the cylinder 15 stands upright. The power unit 10 is firmly supported on the vehicle-body frame 5 by attaching upper and lower sides of a front end portion of the crankcase 14 respectively to lower end portions of the down frame 7a and the hanger bracket 7b by bolt fastening or the like and attaching upper and lower sides of a rear end portion of the crankcase 14 respectively to upper and lower portions of the pivot frame 8 by bolt fastening or the like. Note that, in the drawing, reference numerals M1, M2 respectively denote front frame-fixing portions at the upper and lower sides of the front end portion of the crankcase 14; and reference numerals M3, M4 respectively denote rear frame-fixing portions at the upper and lower sides of the rear end portion of the crankcase 14.

Figure 5:
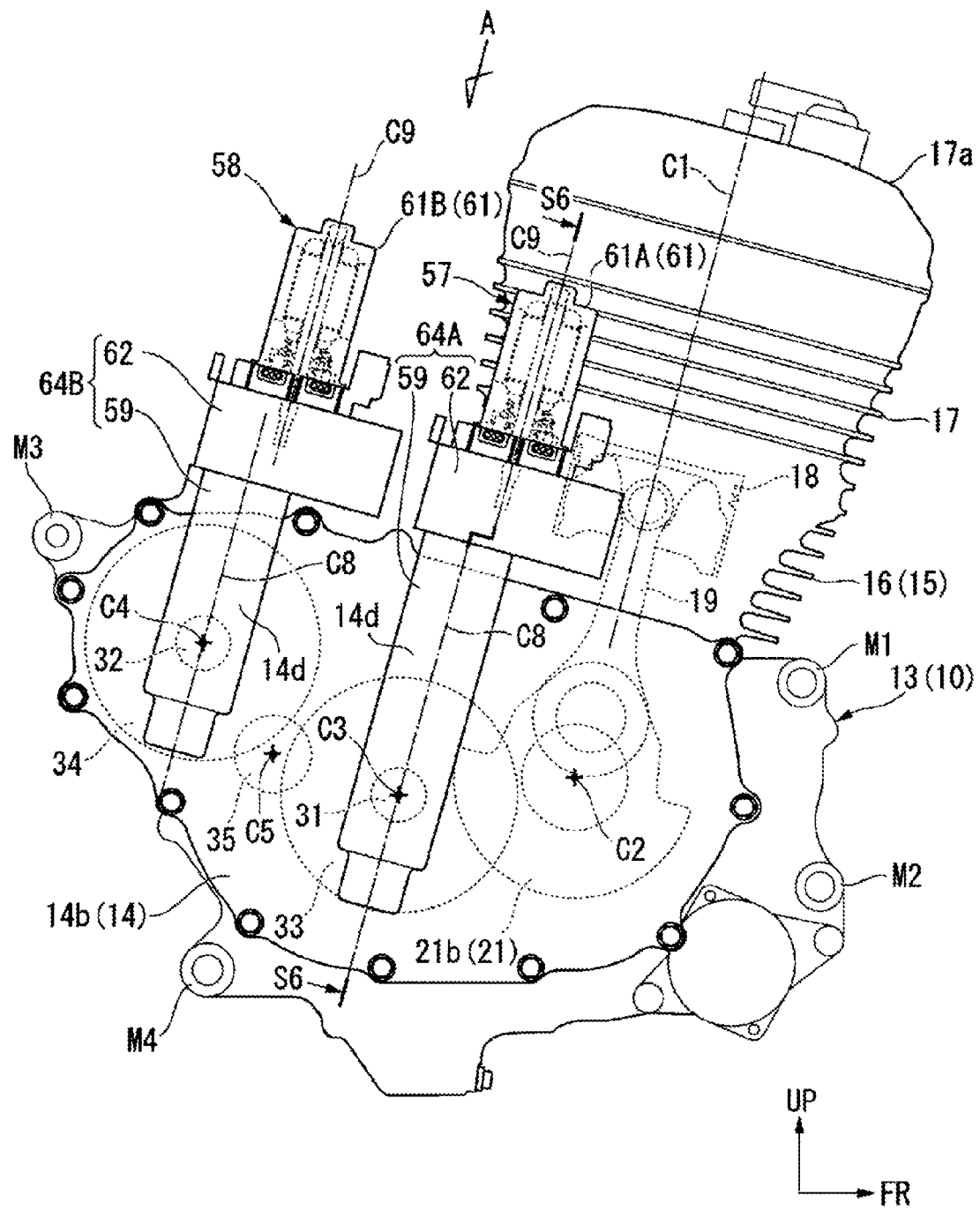
FIG. 5 is a right-side view including a clutch actuator of the power unit.

The cylinder 15 has a cylinder body 16, a cylinder head 17, and a head cover 17a in this order from the crankcase 14 side (see FIG. 5). Intake and exhaust parts are connected respectively to a rear portion (intake side) of the cylinder head 17 and a front portion (exhaust side) of the cylinder head 17 (none are illustrated).

A piston 18 that reciprocates along the cylinder axis C1 is fitted in the cylinder body 16. The reciprocal motion of the piston 18 is converted into a rotational motion of a crankshaft 21 through a connecting rod 19.

Figure 3:
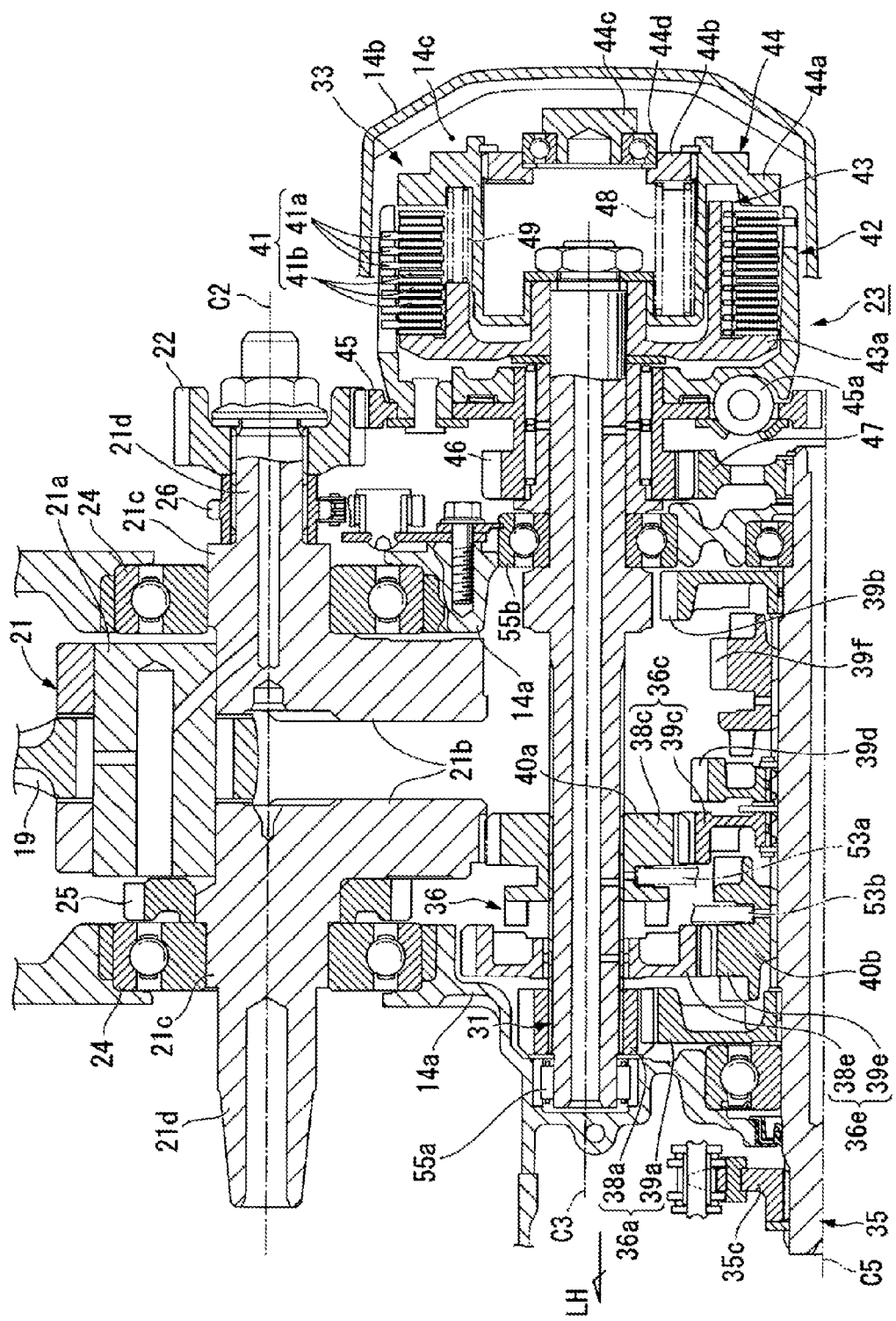
FIG. 3 is a cross-sectional view taken in parallel to axes around a first main shaft and a crankshaft of the power unit.

As shown in FIGS. 2 and 3, the crankshaft 21 as a power shaft of the power unit 10 is housed in a front portion of the crankcase 14. The crankshaft 21 has: a pair of right and left crank webs 21b supporting a crank pin 21a; right and left journal portions 21c protruding outwardly in lateral directions from these right and left crank webs 21b; and right and left support shafts 21d further extending outwardly in the lateral directions from the right and left journal portions 21c. The left support shaft 21d supports a rotor of an unillustrated alternator rotatably and integrally therewith. The right support shaft 21d supports a primary drive gear 22 rotatably and integrally therewith, the primary drive gear 22 configured to transmit a power to the transmission 23.

Note that, in FIG. 3, reference numeral C2 denotes a rotation center axis (crank axis) of the crankshaft 21 (right and left journal portions 21c) along the lateral direction; reference numeral 24 denotes right and left radial ball bearings rotatably supporting the right and left journal portions 21c on right- and left-side wall portions 14a of the crankcase 14; reference numeral 25 denotes an oil pump drive gear supported between the left crank web 21b and the left journal portion 21c rotatably and integrally therewith; and reference numeral 26 denotes a cam drive sprocket supported between the right journal portion 21c and the primary drive gear 22 rotatably and integrally therewith.

Moreover, in FIG. 2, reference numeral 27 denotes the pivot shaft along the lateral direction for supporting a front end portion of the swingarm 9; reference numeral C7 denotes a swing center axis (pivot axis) of the pivot shaft 27 along the lateral direction; reference numeral 28 denotes an oil pump disposed below the crankshaft 21 in the crankcase 14; and reference numeral 29 denotes a starter motor attached to the lower side of the front end portion of the crankcase 14.

Referring to FIG. 2, the transmission 23 and a change mechanism 51 are housed in a rear portion of the crankcase 14. The transmission 23 is provided in a power transmission pathway between the engine 13 and the driving wheel. The change mechanism 51 switches the transmission stage of the transmission 23. A rotational power of the crankshaft 21 is outputted to a left side of the rear portion of the crankcase 14 through the transmission 23 and then transmitted to the rear wheel 11 through, for example, a chain-type transmission mechanism.

Figure 4:
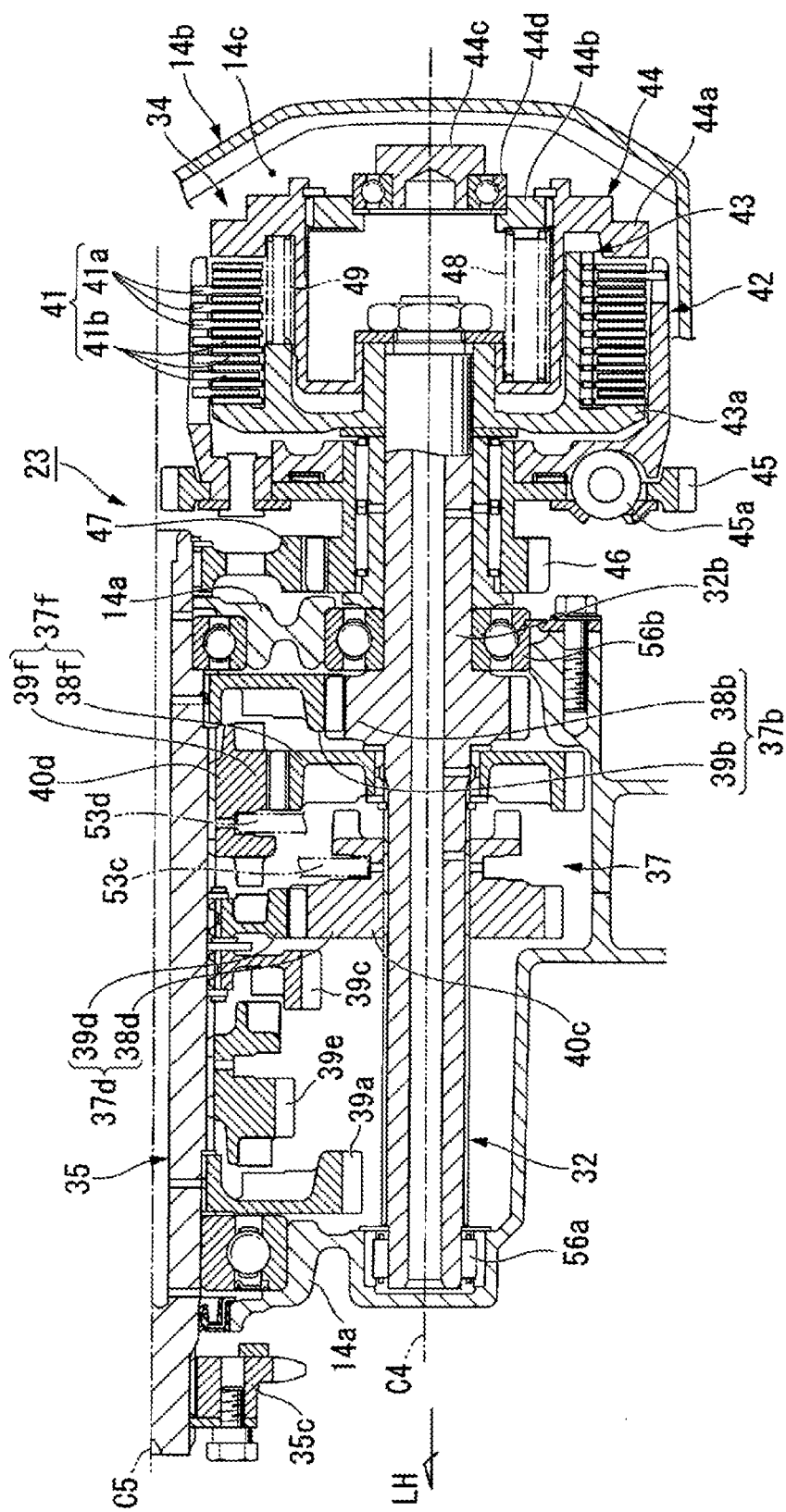
FIG. 4 is a cross-sectional view taken in parallel to an axis around a second main shaft of the power unit.

Referring to FIGS. 3 and 4 together, the transmission 23 has: first and second main shafts 31, 32 extending in the lateral direction in parallel to each other but having different axes; first and second clutches 33, 34 coaxially supported respectively on right end portions of the first and second main shafts 31, 32; a single countershaft 35 extending in the lateral direction in parallel to the main shafts 31, 32 but having a different axis therefrom; a first transmission gear set 36 provided across the first main shaft 31 and the countershaft 35; and a second transmission gear set 37 provided across the second main shaft 32 and the countershaft 35. The first transmission gear set 36 includes multiple gear trains (gear pairs) for odd-numbered transmission stages. The second transmission gear set 37 includes multiple gear trains (gear pairs) for even-numbered transmission stages. Note that, in the drawing, reference numerals C3, C4, C5 respectively denote rotation center axes of the main shafts 31, 32, and the countershaft 35 (first main axis, second main axis, counter axis) along the lateral direction.

The transmission 23 is capable of transmitting a power by selectively using any one of the gear trains. During a normal operation at a fixed transmission stage, one of the clutches 33, 34 is in an engaged state, while the other is in a disengaged state. A power is transmitted using any one of the gear trains connected to the clutch in the engaged state. Moreover, while a gear train is selected in advance from the gear trains connected to the clutch in the disengaged state to create a state where a power can be transmitted using the gear train thus selected. In this state, the clutch in the engaged state is brought into a disengaged state, while the clutch previously in the disengaged state is brought into an engaged state (the clutches 33, 34 are changed); thereby, a transmission stage is switched between an odd-numbered transmission stage and an even-numbered transmission stage.

Referring to FIGS. 3 and 4, each of the clutches 33, 34 is a wet multi-plate clutch having multiple clutch plates 41 alternately stacked on one another in the axial direction, and housed in a right-side portion (in the clutch chamber 14c) of the crankcase 14. Note that, in the drawing, reference numeral 14b denotes a clutch cover covering a right-side portion of the clutch chamber 14c (the clutches 33, 34) and the periphery thereof (front, rear, left, right sides).

Figure 6:
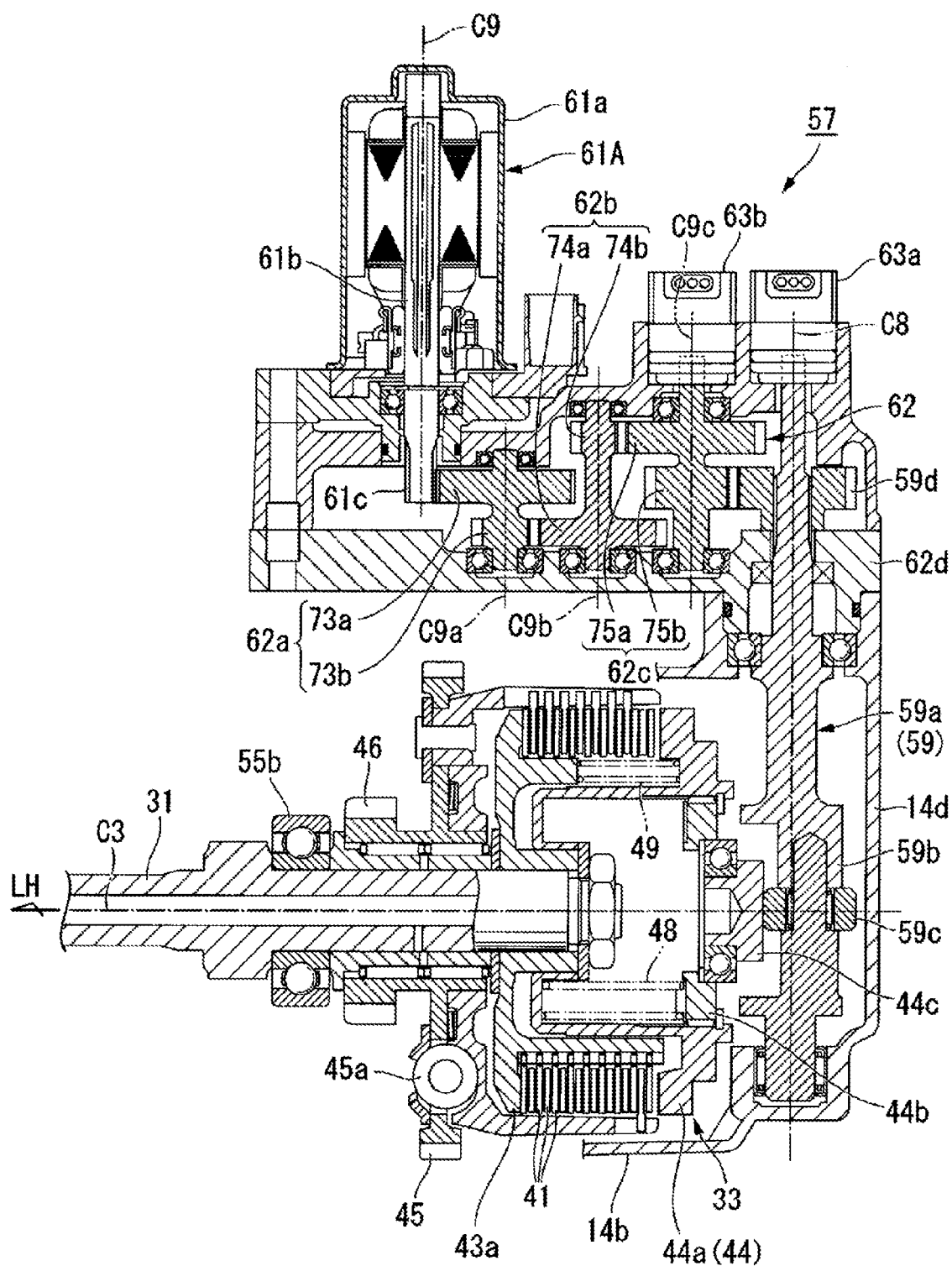
FIG. 6 is a cross-sectional view taken along the line S6-S6 in FIG. 5.

The clutches 33, 34 are of mechanical type in which the clutch plates 41 of their own are friction-engaged with each other by pressing forces from single clutch drive mechanisms 57, 58, respectively (see FIGS. 5, 6). Note that, for the convenience of the illustration, the illustration of the clutch drive mechanisms 57, 58 are simplified in FIGS. 3, 4.

Herein, the motorcycle 1 includes a so-called AMT (Automatic Manual Transmission) and is capable of engaging and disengaging the clutches 33, 34 by utilizing a driving force of a clutch actuator such as an electric motor in synchronism with an operation of a shift handler and a predetermined shift timing.

The transmission 23 is of constant engagement type in which a driving gear and a driven gear corresponding to each transmission stage are always engaged with each other. The type of the gears roughly includes a free gear rotatable relatively to a shaft supporting the gear, and a sliding gear spline-fitted to the shaft. When the sliding gear is moved in the axial direction by driving the change mechanism 1, the gears are switched to transmit a power using the gear trains corresponding to one of the transmission stages.

The shafts 31, 32, 35 are arranged rearward from the crankshaft 21 in the order of the first main shaft 31, the countershaft 35, and the second main shaft 32 in such a manner that the more apart from the crankshaft 21 to the rear, the higher the position. A shift drum 52 of the change mechanism 51 is disposed above the first main shaft 31 and in front of the second main shaft 32. A left end portion of the countershaft 35 protrudes outside the crankcase 14. A driving unit (drive sprocket in the drawing) 35c of the transmission mechanism is provided at the protruding portion.

The change mechanism 51 has: the hollow cylindrical shift drum 52 parallel to the shafts 31, 32, 35; and four shift forks 53a to 53d respectively engaged with four lead grooves (unillustrated) formed at an outer periphery of the shift drum 52. The shift forks 53a to 53d separately move in the axial direction according to the patterns of the lead grooves so as to separately move later-described shifter 40a to 40d of the transmission 23 in the axial direction. Thereby, a gear is appropriately selected (set as a power transmitting element) which is used for power transmission between the countershaft 35 and one of the main shafts 31, 32 in the transmission. Note that, in the drawing, reference numeral C6 denotes a rotation center axis (drum axis) of the shift drum 52 along the lateral direction.

Referring to FIG. 3, a left end portion of the first main shaft 31 is rotatably supported on the left-side wall portion 14a of the crankcase 14 with a left radial needle bearing 55a. A right end portion of the first main shaft 31 is rotatably supported on the right-side wall portion 14a of the crankcase 14 with a right ball bearing 55b. The first clutch 33 is coaxially supported on a portion of the first main shaft 31 extending rightward of the right radial ball bearing 55b.

Referring to FIG. 4, a left end portion of the second main shaft 32 is rotatably supported on the left-side wall portion 14a of the crankcase 14 with a left radial needle bearing 56a. A right end portion of the second main shaft 32 is rotatably supported on the right-side wall portion 14a of the crankcase 14 with a right radial ball bearing 56b. The second clutch 34 is coaxially supported on a portion of the second main shaft 32 extending rightward of the right ball needle bearing 56b.

Referring to FIG. 3, the first clutch 33 has: a clutch outer 42 supported rotatably relatively to the first main shaft 31, having a bottomed cylindrical shape with the same axis as the first main shaft 31 and opened to the right, and configured to transmit a rotational power always to and from the crankshaft 21; a clutch inner 43 coaxially disposed at an inner peripheral side of the clutch outer 42, supported rotatably and integrally with the first main shaft 31, and having the same bottomed cylindrical shape as the clutch outer 42; the multiple clutch plates 41 stacked in the axial direction between cylindrical walls of the clutch outer 42 and the clutch inner 43; and a pressure unit 44 coaxially disposed at an opening side of the clutch inner 43 and configured to press the stacked clutch plates 41 (hereinafter may be referred to as clutch plate set 41) to the left.

To a left side of a bottom wall of the clutch outer 42, a large-diameter transmission gear (primary driven gear) 45 having a larger diameter than the bottom wall is attached with a damper 45a interposed between. The primary drive gear 22 provided on a right end portion of the crankshaft 21 engages with the large-diameter transmission gear 45. A small-diameter transmission gear 46 having a comparatively small diameter is integrally formed on a left side of an inner peripheral side of the large-diameter transmission gear 45. An idle gear 47 engages with the small-diameter transmission gear 46. The idle gear 47 is rotatably supported on a right end portion of the countershaft 35. A large-diameter transmission gear 45 of the second clutch 34 to be described later also engages with the idle gear 47.

At an inner peripheral side of a cylindrical wall of the clutch outer 42, ones in the clutch plates 41 supported on the clutch outer 42 (clutch discs 41a) are supported integrally rotatably and movably in the axial direction. At an outer peripheral side of a cylindrical wall of the clutch inner 43, ones in the clutch plates 41 supported on the clutch inner 43 (clutch plates 41b) are supported integrally rotatably and movably in the axial direction. A left press flange 43a is formed integrally with an outer periphery of a bottom wall of the clutch inner 43. The left press flange 43a is adjacent to the left of a left side surface of the clutch plate set 41.

A right press flange (pressure plate) 44a of the pressure unit 44 is provided adjacent to a right side of a right side surface of the clutch plate set 41. The right press flange 44a is moved leftward by driving the clutch drive mechanisms 57, 58 as described later. Thereby, the clutch plate set 41 is compressed between the left and right press flanges 43a, 44a and integrally friction-engaged with each other. This brings a clutch engaged state capable of torque transmission between the clutch outer 42 and the clutch inner 43. Meanwhile, when the right press flange 44a is moved rightward, the friction engagement is terminated. This brings a clutch disengaged state incapable of the torque transmission.

The pressure unit 44 has: the right press flange 44a rotatable integrally with the clutch inner 43; a press ring 44b disposed at an inner peripheral side of the right press flange 44a and capable of pressing the right press flange 44a leftward with a clutch spring 48; and a press cap 44c engaging rotatably relatively to an inner peripheral side of the press ring 44b with a radial ball bearing 44d and capable of pressing the press ring 44b leftward.

A cam shaft (engagement shaft) 59a of each of the clutch drive mechanisms 57, 58 to be described later is disposed to a right side of the press cap 44c. When the cam shaft 59a presses the right press flange 44a leftward via the press cap 44c and the press ring 44b, the clutch plate set 41 is compressed for friction-engagement. Meanwhile, when the pressing is terminated, the right press flange 44a is moved rightward by action of a return spring 49 provided between the right press flange 44a and the clutch inner 43; hence, the compression and the friction engagement are terminated.

Note that the second clutch 34 also has the same configuration as the first clutch 33 (see FIG. 4). The same parts are denoted by the same reference numerals, and the detailed description thereof is omitted.

Referring to FIGS. 2 to 4, a rotational power from the primary drive gear 22 (crankshaft 21) is inputted to the large-diameter transmission gear 45 of the clutch outer 42 of the first clutch 33.

Meanwhile, to the clutch outer 42 of the second clutch 34, a rotational power from the crankshaft 21 is transmitted via the primary drive gear 22, the large-diameter transmission gear 45 of the first clutch 33, the small-diameter transmission gear 46 of the first clutch 33, the idle gear 47, the small-diameter transmission gear 46 of the second clutch 34, and the large-diameter transmission gear 45 of the second clutch 34 in this order.

The transmission gear sets 36, 37 have six transmission stages in total.

The first transmission gear set 36 includes a first, third, and fifth speed gear trains 36a, 36c, 36e corresponding to odd-numbered stages (first, third, fifth speeds), and is provided across right side portions of the first main shaft 31 and the countershaft 35. The first speed gear train 36a includes a first speed drive gear 38a and a first speed driven gear 39a. The third speed gear train 36c includes a third speed drive gear 38c and a third speed driven gear 39c. The fifth speed gear train 36e includes a fifth speed drive gear 38e and a fifth speed driven gear 39e.

Meanwhile, the second transmission gear set 37 includes a second, fourth, and sixth speed gear trains 37b, 37d, 37f corresponding to even-numbered stages (second, fourth, sixth speeds), and is provided across left side portions of the second main shaft 32 and the countershaft 35. The second speed gear train 37b includes a second speed drive gear 38b and a second speed driven gear 39b. The fourth speed gear train 37d includes a fourth speed drive gear 38d and a fourth speed driven gear 39d. The sixth speed gear train 37f includes a sixth speed drive gear 38f and a sixth speed driven gear 39f.

By selectively setting any one of the gear trains of these transmission gear sets 36, 37, a rotational power of the crankshaft 21 inputted to any one of the main shafts 31, 32 is transmitted to the countershaft 35 while the speed is reduced at a predetermined reduction ratio.

An ECU (unillustrated) as a control unit of the transmission 23 controls the operations of the clutches 33, 34 and the shift drum 52 on the basis of information detected by various sensors, so that the transmission stage (shift position) of the transmission 23 is changed.

Specifically, the transmission 23 transmits a power using any one of the transmission gear trains connected to one of the clutches 33, 34 in an engaged state. In addition, while the transmission gear train is selected in advance which is to be set as the next connection among the transmission gear trains connected to the other of the clutches 33, 34, disengagement of the one of the clutches and engagement of the other clutch are performed simultaneously in that state. Thereby, the power transmission is switched to that uses the transmission gear train selected in advance. Hence, the transmission 23 is shifted up or shifted down.

When the engine of the motorcycle 1 is actuated with the vehicle being stopped, the clutches 33, 34 are kept in disengaged states in the transmission 23. In order to prepare for starting the motorcycle 1, a neutral state incapable of transmitting a power with any of the transmission gear trains is brought into a first speed state where the first speed gear (starting gear, first speed gear train 36a) is set. In this state, for example, by increasing the engine speed, the first clutch 33 is brought into an engaged state after a half-clutch state. Then, the motorcycle 1 is started.

When the motorcycle 1 is running, only one of the clutches corresponding to a current shift position is in an engaged state in the transmission 23. Then, the transmission gear train corresponding to the next shift position is set in advance on the basis of vehicle driving information and the like among any of the transmission gear trains connected to the other clutch in a disengaged state.

Specifically, when a current shift position is an odd-numbered stage (or even-numbered stage), the next shift position is an even-numbered stage (or odd-numbered stage). Accordingly, a rotational power of the crankshaft 21 is inputted to the first main shaft 31 (or the second main shaft 32) via the first clutch 33 (or the second clutch 34) which is in an engaged state. In this event, since the second clutch 34 (or the first clutch 33) is in a disengaged state, no rotational power of the crankshaft 21 is inputted to the second main shaft 32 (or the first main shaft 31).

After that, when the ECU determines that the shift timing reaches, the first clutch 33 (or the second clutch 34) in the engaged state is brought into a disengaged state, while the second clutch 34 (or the first clutch 33) in the disengaged state is brought into an engaged state. In this way only, the power transmission is switched to use the transmission gear train corresponding to the next shift position set in advance. Hence, the speed is changed quickly and smoothly without a time lag during the speed changing and an intermittence of the power transmission.

Referring to FIGS. 5, 6, an outer surface of a right side of the crankcase 14 is provided with press mechanisms 59 of the respective first and second clutch drive mechanisms 57, 58. The press mechanisms 59 apply a pressing force (engaging force) respectively to the clutches 33, 34. Note that while FIG. 6 shows the first clutch drive mechanism 57 corresponding to the first clutch 33, the second clutch drive mechanism 58 corresponding to the second clutch 34 also has the same configuration. Note that when the application of the pressing force by the clutch drive mechanisms 57, 58 is terminated, the engagement of the corresponding clutches 33, 34 is terminated by action of the return springs 49. Nevertheless, the clutch drive mechanisms 57, 58 may be configured to apply an engagement-terminating force to the corresponding clutches 33, 34.

Each of the clutch drive mechanisms 57, 58 has: the press mechanism 59 including the cam shaft 59a disposed perpendicularly to the main axis C3 and in parallel to the cylinder axis C1; an electric motor (clutch actuator) 61 disposed in parallel to the cam shaft 59a and configured to apply a rotational power thereto; and a reduction gear mechanism 62 connecting the cam shaft 59a to the electric motor 61. In each of the clutch drive mechanisms 57, 58, the press mechanism 59 and the reduction gear mechanism 62 constitute a power transmission mechanism 64A or 64B for transmitting a driving force of an electric motor 61A or 61B to the clutch 33 or 34. Note that, in the drawings, reference numeral C8 denotes a rotation center axis along a direction in which the cam shaft 59*a* extends; and the reference numeral C9 denotes a drive center axis of the electric motor 61 along a longitudinal direction thereof and parallel to the rotation center axis C8. Hereinafter, the electric motors 61 of the first and second clutch drive mechanisms 57, 58 may be represented by reference numerals 61A, 61B, respectively.

The cam shaft 59*a* of the press mechanism 59 is rotatably supported in a cylindrical mechanism-housing part 14*d* formed integrally with the clutch cover 14*b*. The cam shaft 59*a* has: an eccentric shaft 59*b* provided at a portion crossing the main axis C3; and an eccentric roller 59*c* coaxially supported on the eccentric shaft 59*b*. An outer peripheral surface of the eccentric roller 59*c* comes into contact with a right end surface of the press cap 44*c* of the first clutch 33. When the eccentric shaft 59*b* and the eccentric roller 59*c* are displaced rightward, the right press flange 44*a* is not pressed. Hence, the clutch plate set 41 is not compressed. This brings a clutch disengaged state. When the eccentric shaft 59*b* and the eccentric roller 59*c* are displaced leftward, the right press flange 44*a* is pressed. This brings a clutch engaged state where the clutch plate set 41 is compressed.

The electric motor 61 has a drive shaft 61*b* whose tip end portion protruding downward from a motor body 61*a*. A pinion gear 61*c* is formed at the tip end portion of the drive shaft 61*b*. The pinion gear 61*c* is disposed substantially at the same height as a driven gear 59*d* attached coaxially to an upper end portion of the cam shaft 59*a*.

The reduction gear mechanism 62 connecting the pinion gear 61*c* and the driven gear 59*d* includes first, second, and third reduction gear shafts 62*a*, 62*b*, 62*c*, which are integrally-formed spur gears of large and small sizes, and which are rotatably supported in a casing 62*d* provided on the clutch cover 14*b*. The first, second, and third reduction gear shafts 62*a*, 62*b*, 62*c* respectively have rotation center axes C9*a*, C9*b*, C9*c* parallel to the axes C8, C9.

The first reduction gear shaft 62*a* has: a first large-diameter gear 73*a* disposed at the same height as and in mesh with the pinion gear 61*c*; and a first small-diameter gear 73*b* disposed below the first large-diameter gear 73*a*.

The second reduction gear shaft 62*b* has: a second large-diameter gear 74*a* disposed at the same height as and in mesh with the first small-diameter gear 73*b*; and a second small-diameter gear 74*b* disposed above and apart from the second large-diameter gear 74*a* so as to avoid the first large-diameter gear 73*a*.

The third reduction gear shaft 62*c* has: a third large-diameter gear 75*a* disposed at the same height as and in mesh with the second small-diameter gear 74*b*; and a third small-diameter gear 75*b* disposed below the third large-diameter gear 75*a* and above the second large-diameter gear 74*a* (i.e., substantially at the same height as the first large-diameter gear 73*a*).

The electric motor 61A and the reduction gear mechanism 62 of the first clutch drive mechanism 57 are disposed outside a rear end portion of the cylinder 15. The electric motor 61B and the reduction gear mechanism 62 of the second clutch drive mechanism 58 are disposed outside a rear position of the cylinder 15 (i.e., at back of the first clutch drive mechanism 57). The electric motors 61A, 61B of the clutch drive mechanisms 57, 58 are disposed above the clutch cover 14*b* within a lateral width W thereof. The reduction gear mechanisms 62 of the clutch drive mechanisms 57, 58 are disposed above the clutch cover 14*b* and below the corresponding electric motors 61. The reduction gear mechanisms 62 are provided to bulge rightward from an outer end of the clutch cover 14*b* to the same extent as the mechanism-housing part 14*d*.

The electric motors 61A, 61B are disposed in such a manner that the axes C9 thereof are perpendicular to the crank C2. The electric motors 61A, 61B are disposed on the periphery of the clutch cover 14*b* within the lateral width W (see FIG. 7). As long as such an arrangement is provided, the axes C9 of the electric motors 61A, 61B may be arranged in parallel to or inclining in the vertical direction or a front/rear direction.

Note that, in the drawing, reference numeral 63*a* denotes a rotation sensor coaxially disposed above the cam shaft 59*a*, and reference numeral 63*b* denotes a rotation sensor coaxially disposed above the third reduction gear shaft 62*c*. These rotation sensors 63*a*, 63*b* detect engagement and disengagement of the clutches 33, 34.

Figure 7:
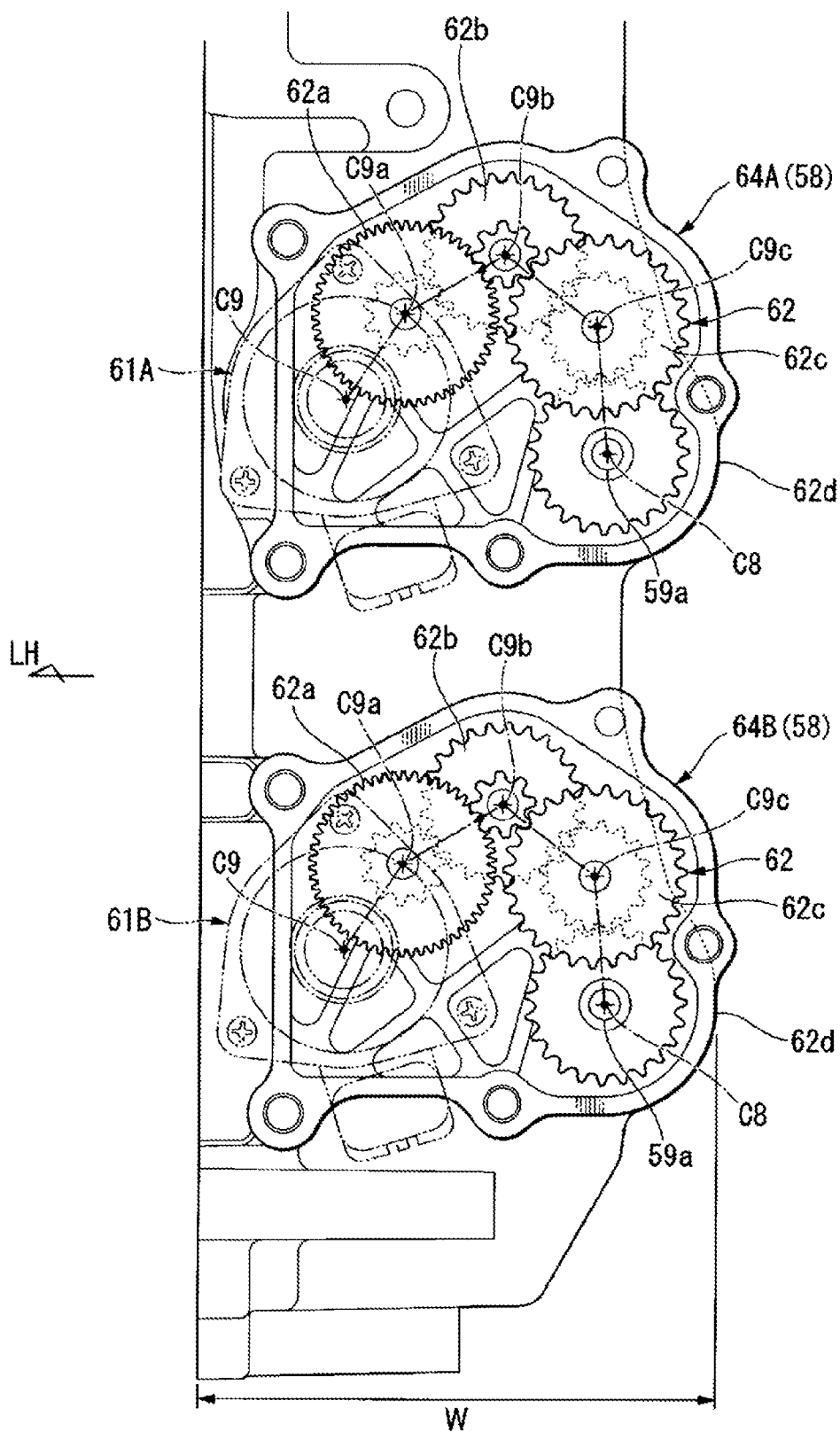
FIG. 7 is a view seen in a direction indicated by the arrow A in FIG. 5.

Referring to FIG. 7, in the reduction gear mechanism 62, the first reduction gear shaft 62*a* (the axis C9*a*) is disposed diagonally frontward of and laterally outward of the drive shaft 61*b* of the electric motor 61 (the axis C9); the second reduction gear shaft 62*b* (the axis C9*b*) is disposed further diagonally frontward of and laterally outward of the first reduction gear shaft 62*a*; the third reduction gear shaft 62*c* (the axis C9*c*) is disposed diagonally rearward and laterally outward of the second reduction gear shaft 62*b*; and the cam shaft 59*a* (the axis C8) is disposed rearward of the third reduction gear shaft 62*c*.

In other words, the axes of the drive shaft 61*b*, the reduction gear shafts, and the cam shaft 59*a* are arranged to form a U shape (or V shape) opened rearward when seen in a top view in the direction along the axis C9. This suppresses the lateral width of the reduction gear mechanisms 62, and facilitates such an arrangement as to align the reduction gear mechanisms 62 of the clutch drive mechanisms 57, 58 in the front-rear direction.

Moreover, the above-described configuration is applicable not only to the power unit including the twin-clutch transmission but also to power units including a general single-clutch transmission.

As described above, in the vehicular power unit 10 according to the embodiment including: the crankcase 14 for housing the crankshaft (power shaft) 21; the first and second clutches 33, 34 disposed on one side of the crankcase 14 in the direction along the power shaft; the electric motors 61A, 61B for generating driving forces for respectively engaging the clutches 33, 34; and the clutch cover 14*b* attached to the crankcase 14 in such a manner as to cover the outer sides of the clutches 33, 34 in the direction along the power shaft, the electric motors 61A, 61B are disposed in such a manner that the drive axes C9 along the longitudinal directions are perpendicular to the direction along the power shaft, and further the electric motors 61A, 61B are disposed on the periphery of (above) the clutch cover 14*b* within the width W in the direction along the power shaft.

According to this configuration, the longitudinal directions of the electric motors 61A, 61B are arranged in the direction perpendicular to the power shaft (the crankshaft 21) of the power unit 10. This makes it possible to suppress bulges of the electric motors 61A, 61B in the direction along the power shaft. Moreover, since the electric motors 61A, 61B are disposed on the periphery of the clutch cover 14*b* within the width W in the direction along the power shaft, the power unit 10 can be made compact. Furthermore, since the electric motors 61A, 61B are disposed outside the clutch cover 14*b*, the maintainability of the electric motors 61A, 61B can be improved. In addition, by effectively utilizing a space above the clutch cover 14*b*, the electric motors 61A, 61B can be disposed without increasing the size of the power unit 10.

Moreover, the power unit 10 includes the power transmission mechanisms 64A, 64B for transmitting driving forces of the electric motors 61A, 61B to the clutches 33, 34, respectively. Each of the power transmission mechanisms 64A, 64B has the multiple reduction gear shafts 62a, 62b, 62c parallel to the drive shaft 61b of the electric motor 61A or 61B. The reduction gear shafts 62a, 62b, 62c are arranged to form a U shape when seen in the direction along the drive shaft of the electric motor 61A or 61B. This makes possible a compact arrangement of the reduction gear shafts 62a, 62b, 62c, and downsizing of the power transmission mechanisms 64A, 64B can be achieved.

Moreover, in the power unit 10, the power transmission mechanisms 64A, 64B have the cam shafts 59a, which are disposed in parallel to the corresponding reduction gear shafts 62a, 62b, 62c, and which are engaged with the press caps 44c (input parts) of the clutches 33, 34, respectively. Accordingly, power transmission pathways from the electric motors 61A, 61B to the clutches 33, 34 are formed of the multiple parallel shafts, and thus can be simplified.

Moreover, in the power unit 10, the electric motors 61A, 61B, the reduction gear shafts 62a, 62b, 62c, and the cam shafts 59a are arranged to form the U shapes when seen in the direction along the drive shaft. This makes possible compact arrangements of the electric motors 61A, 61B, the reduction gear shafts 62a, 62b, 62c, and the cam shafts 59a, and downsizing of the power transmission mechanisms 64A, 64B can be achieved.

Moreover, the power unit 10 includes the cylinder 15 standing upright above the crankcase 14. The drive axes C9 of the electric motors 61A, 61B are arranged in parallel to the cylinder axis C1 along the direction in which the cylinder 15 stands upright. Accordingly, since the electric motors 61A, 61B are disposed along the cylinder 15, the mass of the power unit 10 can be concentrated.

Moreover, in the power unit 10, at least a portion of the electric motor 61A laps on the cylinder 15 when seen in the direction along the power shaft. Accordingly, the electric motor 61A is disposed closely to the cylinder 15. Hence, the mass of the power unit 10 can be further concentrated.

Note that the present invention is not limited to the above-described embodiment. Examples of the engine of the power unit include not only an air-cooled single-cylinder engine but also, in addition to a water-cooled engine, various types of reciprocating engines of various types such as a parallel or V-shaped multi-cylinder engine, and a vertical engine in which a crankshaft is disposed in a vehicle longitudinal direction.

Moreover, the saddle ride-type vehicle includes general vehicles on which the driver rides astride the vehicle body. Such vehicles include not only motorcycles (including scooter-type vehicles) but also three-wheeled vehicles (including a vehicle with one front wheel and two rear wheels and a vehicle with two front wheels and one rear wheel) or four-wheeled vehicles (such as ATV (ALL Terrain Vehicle)).

Further, the configuration in the above embodiment is an example of the disclosed unit. Various modifications can be made within the scope not departing from the gist of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicular power unit, comprising:
    a power unit case for housing a power shaft;
    a clutch device disposed on one side of the power unit case in a direction along the power shaft;
    at least a clutch actuator for generating a driving force for engaging and disengaging the clutch device; and
    a clutch cover attached to the power unit case and covering an outer side of the clutch device in the direction along the power shaft,
    wherein the clutch actuator is disposed in such a manner that a drive axis, oriented in a longitudinal direction thereof, is perpendicular to the direction along the power shaft,
    further wherein the clutch actuator is disposed on a periphery of the clutch cover, within a predetermined width of the clutch cover, in the direction along the power shaft, and
    still further wherein a drive shaft of the clutch actuator, each of a plurality of reduction gear shafts, and an engagement shaft are parallel with one another, and
    further comprising a power transmission mechanism for transmitting the driving force of the clutch actuator to the clutch device,
    wherein the power transmission mechanism includes the engagement shaft, which is engaged with an input part of the clutch device, and
    the drive shaft of the clutch actuator, the reduction gear shafts, and the engagement shaft are arranged forth a U shape when seen in the direction along the drive shaft.

2. The vehicular power unit according to claim 1, wherein the clutch actuator is disposed above the clutch cover.

3. The vehicular power unit according to claim 2, further comprising a power transmission mechanism for transmitting the driving force of the clutch actuator to the clutch device,
    wherein the power transmission mechanism includes the engagement shaft, and which is engaged with an input part of the clutch device, and
    the drive shaft of the clutch actuator, the reduction gear shafts, and the engagement shaft are arranged to form a U shape when seen in the direction along the drive shaft.

4. The vehicular power unit according to claim 2, further comprising a cylinder standing upright above the power unit case,
    wherein the drive axis of the clutch actuator is oriented in parallel to a cylinder axis along a direction in which the cylinder stands upright.

5. The vehicular power unit according to claim 1, further comprising a cylinder standing upright above the power unit case,
    wherein the drive axis of the clutch actuator is oriented in parallel to a cylinder axis along a direction in which the cylinder stands upright.

6. The vehicular power unit according to claim 5, wherein at least a portion of the clutch actuator laps on the cylinder when seen in the direction along the power shaft.

7. The vehicular power unit according to claim 1, further comprising a cylinder standing upright above the power unit case,
    wherein the drive axis of the clutch actuator is oriented in parallel to a cylinder axis along a direction in which the cylinder stands upright.

* * * * *